United States Patent [19]
Gort-Barten

[11] Patent Number: 5,957,723
[45] Date of Patent: Sep. 28, 1999

[54] CORDLESS ELECTRIC KETTLE

[75] Inventor: Leslie Alexander Gort-Barten, London, United Kingdom

[73] Assignee: Dualit Limited, London, United Kingdom

[21] Appl. No.: 08/955,348

[22] Filed: Oct. 21, 1997

[30] Foreign Application Priority Data

Oct. 29, 1996 [GB] United Kingdom .................... 9622460
Dec. 19, 1996 [GB] United Kingdom .................... 9626328
Jan. 23, 1997 [GB] United Kingdom .................... 9701750

[51] Int. Cl.$^6$ .................................................. H01R 13/60
[52] U.S. Cl. ........................................... 439/568; 219/247
[58] Field of Search .................................... 219/247, 432; 439/568, 135, 376, 929, 888; 210/474, 481; 248/603, 604, 613, 615

[56] References Cited

U.S. PATENT DOCUMENTS

| 909,874 | 1/1909 | Danielson . |
| 1,855,570 | 4/1932 | Edison . |
| 2,762,678 | 9/1956 | Moore ..................................... 248/615 |
| 4,921,426 | 5/1990 | Kawasaki et al. ......................... 439/34 |

FOREIGN PATENT DOCUMENTS

WO95/08204  3/1995  WIPO .

*Primary Examiner*—Gary Paumen
*Assistant Examiner*—Alexander Gilman
*Attorney, Agent, or Firm*—Lahive & Cockfield, LLP

[57] ABSTRACT

A cordless electric kettle comprises a power base unit to be connected to a power supply and an extension unit connected to a kettle body, the units being molded from plastics material and each incorporating an electrical connector located substantially on the kettle vertical axis, the electrical connectors being interengagable to form an electrical connection with one another (in the preferred form when the kettle is placed on the base unit at any orientation around the axis). The kettle includes an ON/OFF switch movable to an ON position by a manually operable actuator and a biasing member biasing the switch to an OFF position. In the preferred embodiment a plunger is associated with one of the connectors and arranged to be depressed through a predetermined distance when the connectors are fully engaged, depression of the plunger by the predetermined distance being arranged to disable the biasing member such that the ON/OFF switch may remain in the ON position, the predetermined amount being such that on separation of the base unit and extension unit the biasing member will be restored so as to urge the switch to the OFF position before the electrical connection between the connectors is broken. The base unit and extension unit have engagement parts respectively on upwardly facing and downwardly facing surfaces at least some of which are arranged to substantially always engage one another when the plunger is sufficiently depressed to disable the biasing member despite small inaccuracies in the dimensions of the molded units. The engagement is achieved by springing one or more of the engagement parts by forming adjacent slots in the molding to give limited axial movement inwardly from a rest position. Only a larger portion of an engagement part need be sprung.

12 Claims, 4 Drawing Sheets

CORDLESS ELECTRIC KETTLE

BACKGROUND OF THE INVENTION

This invention relates to cordless electrical kettles.

Conventional cordless kettles have a power base unit to be connected to a power supply and a base extension unit connected to the kettle, the base unit and extension unit each including an electrical connector, with the connectors arranged to electrically interconnect when the kettle is placed on the base unit. In a preferred form the interface between the two units is circular to allow the units to be connected to each other at any angle about the vertical axis of the units. To achieve proper connection one of the connectors fits into a circular sectioned cylindrical recess in the other of the connectors, conventionally the base unit has an upstanding connector fitting into a recess in the connector of the kettle extension unit. It is a requirement that the two connectors are in firm end to end contact.

Such a kettle has a lever-type ON/OFF switch, the actuator of which can be moved to an ON connecting position to complete the electrical circuit when the units are connected, and which will be automatically moved to the OFF position when the water in the kettle boils.

In addition, in a preferred embodiment, in order to prevent arcing between the connectors if the kettle is lifted while the circuit is completed, a biasing means is provided which biases the switch to an OFF position if the kettle is lifted and before the contactors cease to make electrical contact. The biasing means acts on a downwardly extending plunger within the socket recess, the plunger being coupled to an operating arm which interacts with the ON/OFF switch lever. Depression of the plunger as a result of a firm connection of the connectors removes the biasing from the ON/OFF switch lever so that it can stay in the ON position. The plunger is necessarily spaced radially to one side of the vertical axis of the units. Space constrictions on conventional kettles of this type means that the vertical movement of the plunger between its operative and inoperative conditions is small, not exceeding about 1 mm.

The base unit and the extension unit are both conventionally molded from plastics materials and the connectors securely fastened thereto so that no vertical movement of the connectors relative to the moldings can occur. Because of the tolerances which must be allowed for in the molding. manufacture and because of warping of the moldings, it is the practice, in order to ensure proper firm contact in every product between the connectors (and the depression of the plunger), that the units are designed to allow a small gap between the surfaces of the moldings surrounding the connectors, when the connectors are interconnected. A gap of 0.5 to 1 mm is usually built into the design.

However this gap leads to vibration/wobble of the kettle in use which is undesirable. An object of the present invention is to prevent/reduce the amount of vibration or wobble in a cordless kettle of this type.

Conventionally the base of the extension unit is formed with three equal feet having rounded lower surfaces and it is these lower surfaces which form engagement parts and are, by design, spaced from the upper surface of the base molding.

SUMMARY OF THE INVENTION

According to one form of the present invention, in a cordless kettle having a base molding and an extension molding one or more of the feet or other engagement parts on one of the moldings is/are sprung so that it/they have limited axial movement relative to the remainder of the molding.

In one preferred form the invention provides a cordless electrical kettle comprising a power base unit having connecting means for connection to a power supply, a kettle body and an extension unit connected to a lower part of the kettle body, the power unit and extension unit being molded from plastics material and each incorporating an electrical connector, the electrical connectors being interengagable to form an electrical connection with one another when the extension unit and kettle body is placed on the base unit, an ON/OFF switch movable to an ON position by a manually operable actuator to complete a connection to the power supply, one of the base unit and extension unit having discrete engagement parts extending towards an opposed surface of the other of the base unit and extension unit, at least one of the engagement parts being provided with limited sprung axial movement relative to the remainder of the molded, such that at least one of the engagement parts is arranged to substantially always engage said opposed surface of said other of the units despite small inaccuracies in the dimensions of the moulded units.

In another preferred form the invention provides a cordless electrical kettle comprising a power base unit having connecting means for connection to a power supply, a kettle body having a vertical axis and an extension unit connected to a lower part of the kettle body, the power unit and extension unit being molded from plastics material and each incorporating an electrical connector located substantially on the vertical axis of the kettle body, the electrical connectors being interengagable to form an electrical connection with one another when the kettle body and extension unit is placed on the base unit at any orientation around said axis, an ON/OFF switch movable to an ON position by a manually operable actuator to complete a connection to the power supply, biasing means biasing the switch to an OFF position, a plunger mounted adjacent the connector of the extension unit and arranged to be depressed through a predetermined distance when the connectors are fully engaged, depression of the plunger by the predetermined distance being arranged to disable the biasing means such that the ON/OFF switch may remain in the ON position, the predetermined distance being such that on separation of the base unit and the extension unit the biasing means will be restored so as to urge the switch to the OFF position before the electrical connection between the connectors is broken, one of the base unit and extension unit having discrete engagement parts extending towards an opposed surface of the other of the base unit and extension unit, at least one of the engagement parts being provided with limited sprung axial movement relative to the remainder of the molding, such that at least one of the engagement parts is arranged to substantially always engage said opposed surface of said other of the units when the plunger is sufficiently depressed to disable the biasing means despite small inaccuracies in the dimensions of the molded units.

In a preferred form one or more of the feet or other engagement parts are split into two portions, a first of the portions being sprung so that it has the limited axial movement and the other of the portions being substantially rigidly connected to the molding, the first portion being longer (in a direction outwardly of the molding) than the other portion.

Preferably the or each such foot, which may be split normal to a radius of the moulding, has the first portion partially surrounded by a slit in the molding to provide the springing.

With this arrangement in a preferred form, the feet or longer portion of any split foot, extend outwardly from the molding of the extension unit and are dimensioned so that they theoretically all just engage the surface of the molding of the base unit when the connectors are fully engaged.

Preferably there are three feet, two on the same side of the extension unit as the plunger and one on the opposite side, with those or that foot on one of the sides being so sprung. The foot or longer portion thereof on the opposite side to the plunger may be longer (in a direction extending towards the base unit) that the feet on the same side of the unit as the plunger, for example, by about 1 mm (0.5 to 2 mm) longer.

In another aspect the invention provides a cordless electrical kettle comprising a power base unit having connecting means for connection to a power supply, a kettle body having a vertical axis and an extension unit connected to a lower part of the kettle body, the power base unit and extension unit being molding from plastics material and each incorporating an electrical connector located substantially on the kettle vertical axis, the electrical connectors being interengagable to form an electrical connection with one another when the kettle is placed on the base unit at any orientation around the axis, an ON/OFF switch movable to an ON position by a manually operable actuator, biasing means biasing the switch to an OFF position, a plunger associated with the connectors of the extension unit and arranged to be depressed through a predetermined distance when the connectors are fully engaged, depression of the plunger by the predetermined distance being arranged to disable the biasing means such that the ON/OFF switch may remain in the ON position, the predetermined amount being such that on separation of the base unit and the extension unit the biasing means will be restored so as to urge the switch to the OFF position before the electrical connection between the connectors is broken, one of the base unit and extension unit having discrete engagement parts extending from its upwardly/downwardly facing surface towards the downwardly upwardly facing surface of the other of the units, and one or more of the engagement parts being provided with limited sprung axial movement relative to the remainder of the molding, such that at least one of the engagement parts is arranged to substantially always engage said surface of the other of the units when the plunger is sufficiently depressed to disable the biasing means despite small inaccuracies in the dimensions of the molding units.

BRIEF DESCRIPTION OF THE DRAWINGS

Embodiments of cordless kettle, in accordance with the invention, will now be described, by way of example only, with reference to the accompanying drawings of which.

DETAILED DESCRIPTION OF ONE EMBODIMENT

Figure 1:
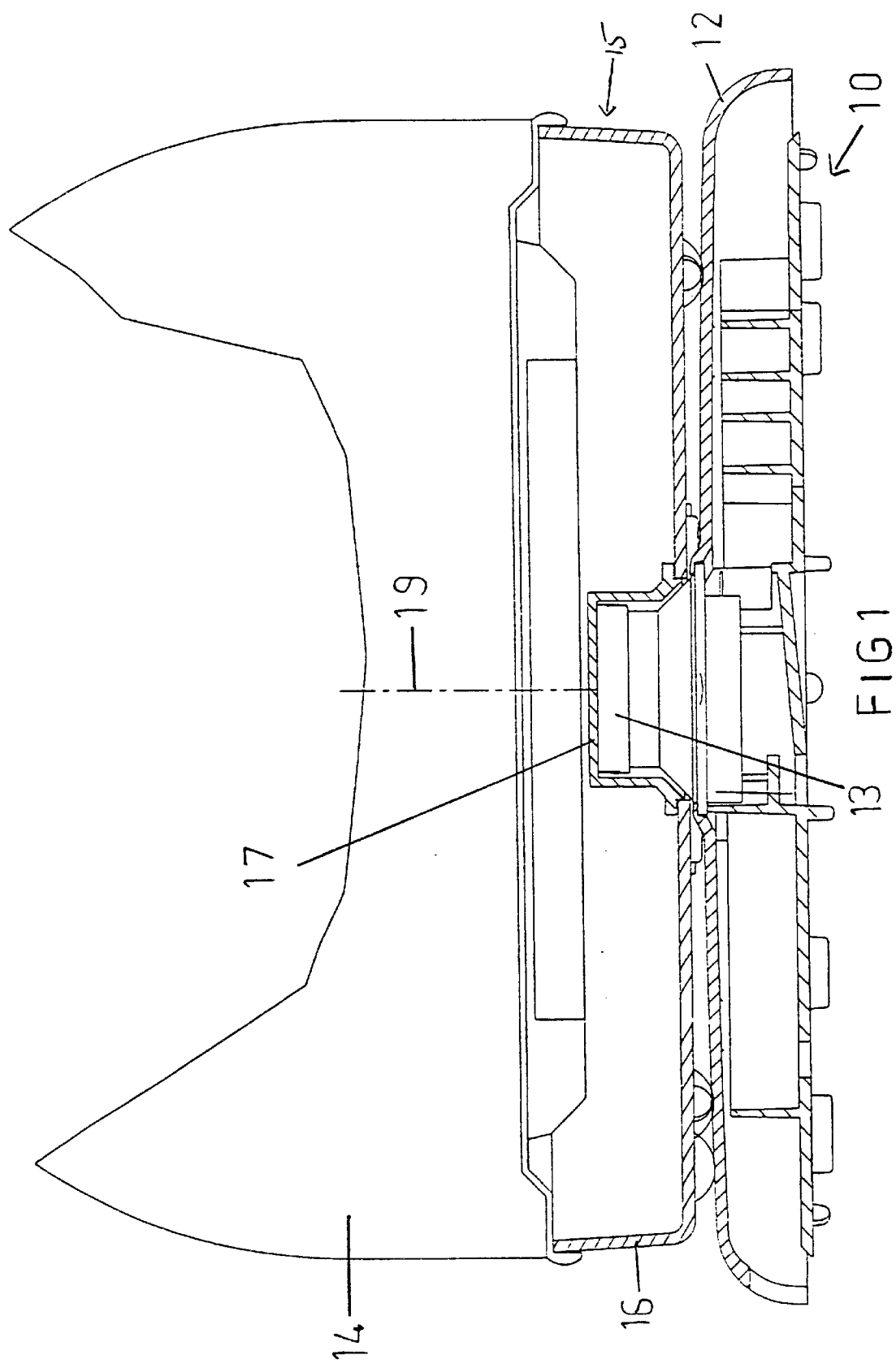
FIG. 1 is a central section through the relevant parts of a cordless kettle.
Figure 2:
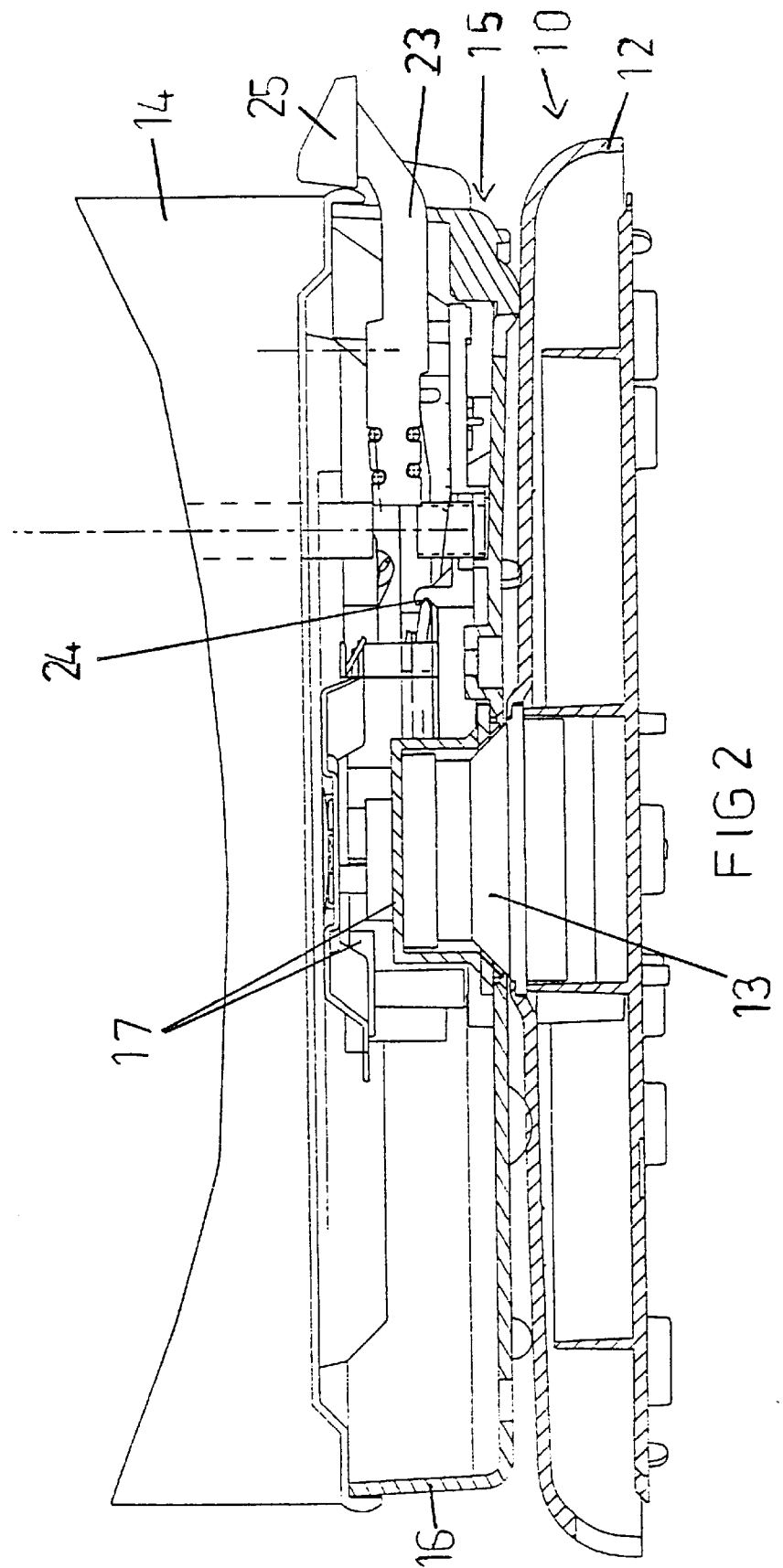
FIG. 2 is a central section at right angles to the section of FIG. 1.

A power base unit 10 of a cordless kettle comprises a plastic molding 12 in which is fixed an electrical connector 13 secured to prevent any relative vertical movement between the molding and connector. A minor relative horizontal movement is allowed for. A kettle body 14 has firmly secured thereto a base extension unit 15 comprising a plastics material molding 16 to which is firmly secured an electrical connector 17 designed to interconnect with the connector 13. The power base unit 10 is arranged to be connected to a power source and the connector 17 is electrically connected to the kettle heating element.

The molding 12 and 16 are circular in plan view and the connectors are circular on and about the vertical axis of the kettle, with the connector 17 defining a socket 18 to accommodate the upstanding connector 13 so that the units can be electrically interconnected at any angle about the vertical axis.

Figure 3:
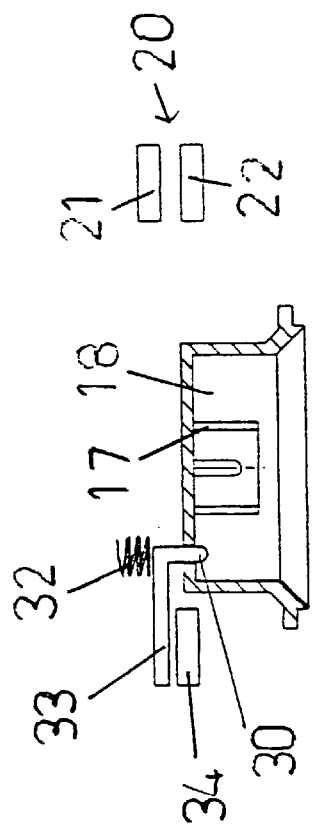
FIG. 3 is a diagrammatic view of interengageable parts of the kettle in a switch OFF condition.

The electrical circuit includes an ON/OFF switch, indicated diagrammatically at 20 in FIG. 3 and including a fixed conductor 21 mounted to the connector 17 and a movable conductor 22 located on a switch actuating lever 23 pivoted about a horizontal axis at 24. The outer end 25 of the lever can be manually depressed to move the conductors 21 and 22 into contact to effectively complete the electrical circuit of the kettle. Means, not shown, are provided for restoring the lever 23 to its OFF position when the water in the kettle boils.

Figure 4:
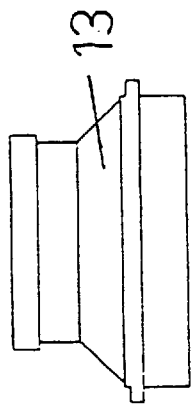
FIG. 4 is a diagrammatic view of the interengaging parts of FIG. 3 in a switch ON position, also showing one form of sprung foot.
Figure 4:
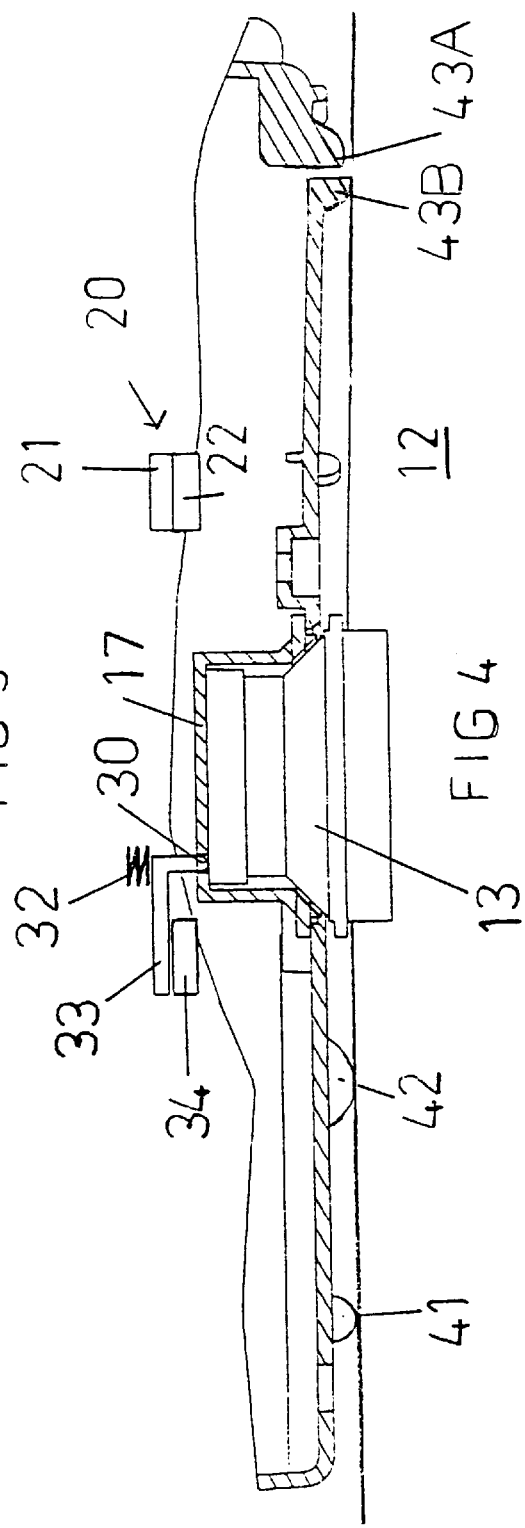

A plunger 30 extends downwardly into the socket 18 of connector 17 and is biased downwardly, as shown diagrammatically in FIG. 3, by a spring 32. Plunger 30 also carries a substantially radially extending arm 33, located to interact with a part 34 of the lever arm 23. With the plunger in its downwardly biased position, shown in FIG. 3, the arm 33 acts on the lever if it is moved to the ON position of the switch and biases it back to its OFF position. Only when the plunger is depressed, by pushing the electrical connector 13 into the socket 18 to form a firm electrical connection, can the ON/OFF switch be left in the ON position to complete the circuit, as shown in FIG. 4. The plunger thereby ensures that the circuit is broken before the electrical connectors 13 and 17 are disconnected if the kettle is lifted from the base when the circuit is completed. This prevents arcing between the connectors 13 and 17.

The cordless kettle as above described is already known. With this type of kettle the plunger movement is small—about 1 mm. It has been found that the moldings cannot be consistently produced to sufficiently close tolerances, allowing also for warping of the moldings, to ensure that the plunger is always fully depressed on connection of the connectors if the moldings are nominally dimensioned to just contact one another when the connectors are fully connected. For this reason it has been normal to design the units with a built-in gap between the base of the extension unit and the upper surface of the power unit of about 1 mm, so that on connection the kettle is supported solely by the centrally located connectors. This leads to unacceptable vibration and wobbling of the kettle and can lead to the kettle tipping to unlatch the ON/OFF switch before the water has boiled.

Conventionally the base of the extension unit is formed with engagement means in the form of three equiangularly spaced feet near the outer edge of the base surface and the gap is left between the rounded lower surfaces of these feet and the upper substantially flat surface of the base unit. In the drawings these feet are indicated at 41, 42 and 43, with the feet 41 and 42 being located on the same side of the extension unit as the plunger and foot 43 being located radially opposite the plunger.

According to the present invention one or more of the feet is sprung for limited axial movement relative to the remainder of the molding, so that it can move inwardly from its rest position.

Figure 5:
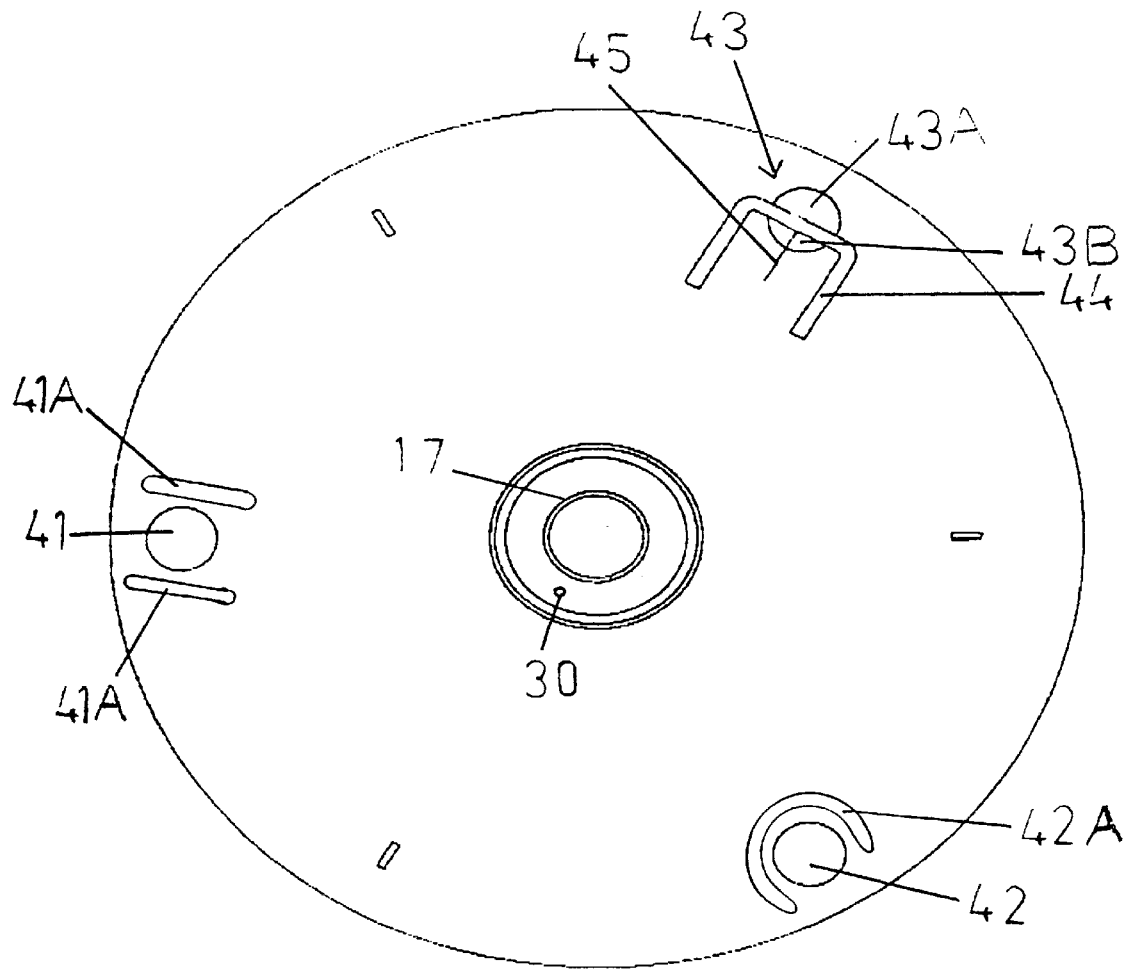
FIG. 5 is a diagrammatic underneath plan view of the base extension on a smaller scale, showing three different forms of sprung foot.
Figure 6:
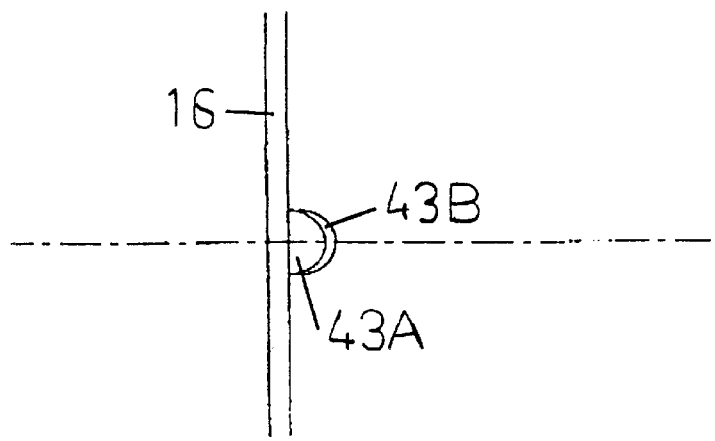
FIG. 6 is a side view which shows diagrammatically one form of sprung foot, corresponding to one of the forms shown in FIG. 5 and to that shown in FIG. 4.

In one preferred form one or more of the feet is split into two portions, a first of which is longer (in a direction towards the base unit) than the other of the portions and the first portion is sprung so that it can move inwardly from its rest position. In this example, as shown in FIGS. 4, 5 and 6, the foot 43 is split into portions 43A and 43B by a slit 44 which extends through the foot and on either side of the portion 43B, which is longer than portion 43A, so that portion 43B normally contacts the base extension unit but has limited sprung movement inwardly. If the spring relaxes sufficiently the portion 43A comes into contact with the power base unit. The portion 43B may be split in two itself along radius 45, and have two halves of different heights. More than one foot can be sprung in this way.

Alternative forms of spring foot are shown in relation to feet 41 and 42. As seen in FIG. 5, a pair of slits 41A are provided on opposite sides of foot 41 and a slit 42A is provided around three sides of foot 42. Other forms of springing could be used.

The longer portion of foot 43 (or other engagement member) may be made longer than the other feet by approximately 1 mm but in the range 0.5 to 2 mm with the other feet still being dimensioned to theoretically leave a gap of approximately 0.5 mm between their lower surfaces and the upper surface of the base unit.

In an alternative arrangement all the feet are lengthened or at least the longer portion of any sprung foot so that there is no gap built into the design (nominally the moldings just contact one another on full interconnection of the connectors). This spring loading must be such that the weight of the kettle plus a minimum amount of water in it will overcome the springing and depress the feet if necessary to overcome dimensional errors to allow full interconnection. The feet or other engagement members could be upstanding from the base and able to move downwardly under the kettle weight.

The sprung foot or feet can be applied to cordless kettles not having centrally located electrical connectors and not having a plunger interlock arrangement.

What is claimed is:

1. A cordless kettle comprising a power base unit having connecting means for connection to a power supply, a kettle body having an extension unit forming a lower part thereof, the power unit and extension unit being molded from plastics material and each incorporating an electrical connector, the electrical connectors being interengageable to form an electrical connection with one another when the kettle body is placed on the power base unit, one of the extension unit and power base unit having molded therein one or more feet at least one of which is sprung so that it is capable of limited vertical movement under the weight of the kettle body relative to the remainder of the unit.

2. A cordless electrical kettle comprising a power base unit having connecting means for connection to a power supply, a kettle body and an extension unit connected to a lower part of the kettle body, the power unit and extension unit being molded from plastics material and each incorporating an electrical connector, the electrical connectors being interengagable to form an electrical connection with one another when the extension unit and kettle body is placed on the base unit, an ON/OFF switch movable to an ON position by a manually operable actuator to complete a connection to the power supply, one of the base unit and extension unit having discrete engagement parts extending towards an opposed surface of the other of the base unit and extension unit, at least one of the engagement parts being provided with limited sprung axial movement relative to the remainder of the molding, such that at least one of the engagement parts is arranged to substantially always engage said opposed surface of said other of the units despite small inaccuracies in the dimensions of the molded units.

3. A kettle according to claim 1 in which the kettle body has a vertical axis and the electrical connectors are located on said axis so that the kettle body and power base unit can be connected at any relative angle about that axis.

4. A cordless electric kettle comprising a power base unit having connecting means for connection to a power supply, a kettle body having a vertical axis and an extension unit connected to a lower part of the kettle body, the power unit and extension unit being molded from plastics material and each incorporating an electrical connector located substantially on the vertical axis of the kettle body, the electrical connectors being interengagable to form an electrical connection with one another when the kettle body and extension unit is placed on the base unit at any orientation around said axis, an ON/OFF switch movable to an ON position by a manually operable actuator to complete a connection to the power supply, biasing means biasing the switch to an OFF position, a plunger mounted adjacent the connector of the extension unit and arranged to be depressed through a predetermined distance when the connectors are fully engaged, depression of the plunger by the predetermined distance being arranged to disable the biasing means such that the ON/OFF switch may remain in the ON position, the predetermined distance being such that on separation of the base unit and the extension unit the biasing means will be restored so as to urge the switch to the OFF position before the electrical connection between the connectors is broken, one of the base unit and extension unit having discrete engagement parts extending towards an opposed surface of the other of the base unit and extension unit, at least one of the engagement parts being provided with limited sprung axial movement relative to the remainder of the moulding, such that at least one of the engagement parts is arranged to substantially always engage said opposed surface of said other of the units when the plunger is sufficiently depressed to disable the biasing means despite small inaccuracies in the dimensions of the molded units.

5. A kettle according to claim 2 in which one or more of the engagement parts is split into two portions, a first of the portions being sprung so that it has the limited axial movement and the other of the portions being substantially rigidly connected to said one unit, the first portion extending further in a direction towards said opposed surface of said other of the units than said other of the portions extends.

6. A kettle according to claim 2 in which the sprung limited axial movement is provided by a slot or slots in said unit adjacent one or more of the engagement parts.

7. A kettle according to claim 2 in which the engagement parts comprise downwardly extending feet on the extension unit, and the opposed surface of the base unit is substantially level.

8. A kettle according to claim 4 in which the engagement parts comprise three downwardly extending feet on the extension unit with a single one of said feet substantially radially opposite the plunger extending downwardly for a greater distance than the other two feet, said single foot being provided with the limited axial movement.

9. A kettle according to claim 8 in which the single foot is substantially 0.5 to 2 mm longer than the other feet.

10. A kettle according to claim 4 in which the electrical connector of the base unit fits into a recess in the electrical connector of the extension unit and the plunger is biased to extend into the recess to be depressed by engagement with an end face of the electrical connector the base unit.

11. A kettle according to claim 4 in which the plunger is movable through a distance of substantially 1 mm.

12. A cordless electric kettle comprising a power base unit having connecting means for connection to a power supply, a kettle body having a vertical axis and an extension unit connected to a lower part of the kettle body, the power base unit and extension unit being molded from plastics material and each incorporating an electrical connector located substantially on the kettle vertical axis, the electrical connectors being interengagable to form an electrical connection with one another when the kettle is placed on the base unit at any orientation around the axis, an ON/OFF switch movable to an ON position by a manually operable actuator, biasing means biasing the switch to an OFF position, a plunger associated with the connectors of the extension unit and arranged to be depressed through a predetermined distance when the connectors are fully engaged, depression of the plunger by the predetermined distance being arranged to disable the biasing means such that the ON/OFF switch may remain in the ON position, the predetermined distance being such that on separation of the base unit and the extension unit the biasing means will be restored so as to urge the switch to the OFF position before the electrical connection between the connectors is broken, one of the base unit and extension unit having discrete engagement parts extending from its upwardly/downwardly facing surface towards the downwardly/upwardly facing surface of the other of the units, and one or more of the engagement parts being provided with limited sprung axial movement relative to the remainder of the molding, such that at least one of the engagement parts is arranged to substantially always engage said surface of the other of the units when the plunger is sufficiently depressed to disable the biasing means despite small inaccuracies in the dimensions of the molded units.

* * * * *